Figure 1:
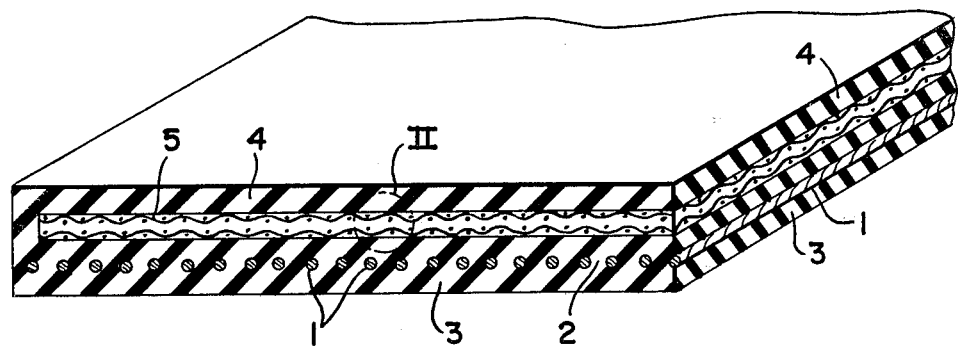

United States Patent [19]

Heynhold

[11] 4,411,947

[45] Oct. 25, 1983

[54] CONVEYOR BELT

[75] Inventor: Ingo Heynhold, Kalefeld, Fed. Rep. of Germany

[73] Assignee: Continental Gummi-Werke Aktiengesellschaft, Hanover, Fed. Rep. of Germany

[21] Appl. No.: 320,009

[22] Filed: Nov. 10, 1981

[30] Foreign Application Priority Data

Nov. 11, 1980 [DE] Fed. Rep. of Germany ....... 3042473

[51] Int. Cl.³ .......................... D03D 3/00; B32B 7/00
[52] U.S. Cl. .................................. 428/250; 428/257; 198/847
[58] Field of Search ............... 428/225, 224, 257, 245, 428/246, 250; 198/847

[56] References Cited

U.S. PATENT DOCUMENTS

| 2,633,227 | 3/1953 | Hutchins | 198/847 |
| 3,941,162 | 3/1976 | McCabe et al. | 428/245 |
| 4,025,684 | 5/1977 | Neidhardt | 428/257 |

*Primary Examiner*—Marion McCamish
*Assistant Examiner*—Beverly Kay Johnson
*Attorney, Agent, or Firm*—Becker & Becker, Inc.

[57] ABSTRACT

Conveyor belts made of rubber or rubber-like synthetic materials and having textile and/or metallic reinforcing inserts embedded between an upper cover layer and a lower cover layer. In addition to, and independent of, the reinforcing insert, the conveyor belt is provided with an elastically deformable cushioning insert which contains air pockets and is embedded in the upper and-/or the lower cover layer.

1 Claim, 2 Drawing Figures

CONVEYOR BELT

The present invention relates to conveyor belts, especially discharge or feeding belts, which are made of rubber or rubber-like synthetic materials and have textile and/or metallic reinforcing inserts embedded between an upper cover layer and a lower cover layer.

Conveyor belts are always stressed most heavily at the loading location, because here the material being delivered is dropped or thrown from often great heights in free fall upon the load-carrying belt surface. This is particularly true for the discharge and feeding belts which serve as intermediate conveyors, since, because of their relatively short length, these belts are subjected to the impact stresses in considerably quicker succession. In order to at least partially dissipate the impact energy of, above all, lumpy material which is to be delivered, such as pieces of rock, or, coal, etc., and to protect the belts against excessive wear and localized failure, chutes, impact and guide plates, or feed hoppers are frequently connected ahead of the feed or load location. These measures, however, cannot always be used, and they also do not assure effective protection under all circumstances. Basically, the same is true for a resiliently yieldable support of the conveyor belts in the region of the feed or load location, for which purpose, according to known proposals, in addition to the structural configuration or the support location, damping by elastic support rollers is also relied upon. Depending upon the type of belt, it is also known to provide the belt surface in varying degrees with resilient ribs or webs, or deformable blocks, for damping strong impacts. However, this leads to other drawbacks: for a relatively deep surface structure, a thick layer is necessary; the manufacture is not free of problems, and requires a lot of time and apparatus; finally, the flexible surface elements, even when they are thicker, are subject to wear and fatigue failure.

It is therefore an object of the present invention to protect the pull-resistant reinforcing insert arranged in the interior of the cross section of conveyor belts by providing a novel layer construction of the belts themselves, with such protection being effective against destruction by the impacts of material being conveyed, yet without having the drawbacks associated with the heretofore known protective measures.

Figure 2:
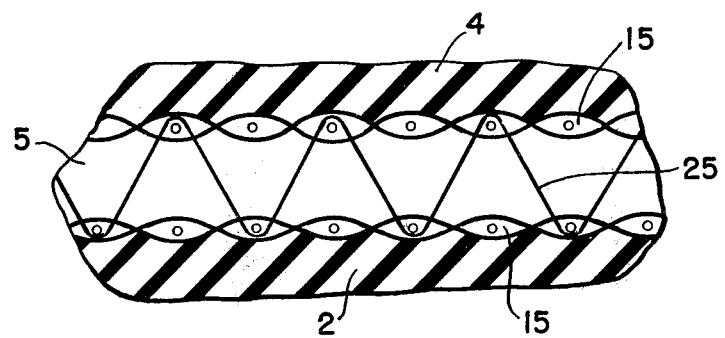

This object, and other objects and advantages of the present invention, will appear more clearly from the following specification in connection with the accompanying drawing, in which:

FIG. 1 is a cross section through a part of one embodiment of a conveyor belt in accordance with the present invention; and FIG. 2 is an enlarged scale illustration to show a partial cutaway of the encircled region II of FIG. 1.

The conveyor belt of the present invention is characterized primarily in that, in addition to and independent of the reinforcing inserts, the conveyor belt is provided with an elastically deformable cushioning insert which contains air pockets and is embedded in the upper and/or lower cover layer. According to one practical embodiment of the concept of the present invention, the cushioning insert is constructed of a composite of multi-layer fabric made of upper and lower fabric strands which are kept spaced apart by connecting threads. The composite fabric, which essentially covers the entire width of the belt, is expediently sealed off toward the outside in the region of the side edges of the conveyor belt.

The present invention introduces a novel element in the layer construction of the conveyor belts of so-called reversible or double weave cloth, or spaced weaving; the present invention further utilizes the particular cushioning characteristics of these composite fabrics for attaining surprisingly advantageous effects. The air volume in the double weave, which is surrounded on all sides by the elastomeric material of the conveyor-belt-cover layer, and is completely embedded therein, results, together with the stabilizing effect of the connecting threads which maintain the spacing, in an effective buffer or cushion effect. This cushion effect also absorbs and reduces stronger impact shocks of heavy and bevelled or angular material being conveyed to such an extent that punctures or other local failures of the cover layers are avoided. A reliable protection of the load-carrying elements located deeper within the belt cross section is assured to a great extent in this manner. At the same time, the comparatively thin double weave cloth requires no significant increase in the thickness of the layer of elastomeric embedding material. Finally, within the framework of the entire progress of the method, no special complications result from the insertion of such connected composite fabrics, even for the production of conveyor belts.

Although the arrangement of the cushion inserts of the present invention is similar to known surface reinforcing, which is in the form of additional strong fabric or wire inserts, for heavily stressed conveyor belts, the effect of the inventive inserts, however, far surpasses the mere penetration protection sought by the prior art. The inventive inserts additionally offer the advantage of not at all, or at least not significantly, affecting the flexibility and the operating behavior of the belts.

Referring now to the drawing in detail, the illustrated conveyor belt is a so-called steel-cable belt, which contains as the only strength carrier parallel steel wire cables 1 which extend in the longitudinal direction and are spaced from one another. The wire cables 1 are embedded in, and are adhesively bonded to, a core layer 2 comprising a readily bondable rubber. The core layer 2 is arranged between a lower cover layer 3 and an upper cover layer 4 which is thicker than the core layer 2. The cover layers 3 and 4 respectively comprise a tough, wear-resistant rubber mixture. However, the present invention is not limited to this specific type of belt, but rather is also applicable with equal effectiveness to other types of belts, including fabric reinforced conveyor belts.

A reversible or double weave cloth 5 is inventively embedded as a cushion insert in the upper cover layer 4 above, and in spaced relationship to, the steel wire cables 1. The double weave cloth 5 comprises two fabric webs or strands 15, which, by means of woven-in or braided-in warp or connecting threads 25, are connected to each other over their entire surfaces and are simultaneously kept parallel, and in spaced relationship, to each other. Since the double weave cloth 5 is embedded completely in the elastomeric cover layer 4, and since its side edges are outwardly sealed off over the entire length of the belt, the double weave cloth 5 acts within the belt as an air-filled hollow body, which absorbs every mechanically produced compression of the belt cover layer 4 in the manner of a cushion insert.

It is also within the scope of the present invention to provide such a cushion insert, which is made of a composite fabric, in the lower cover layer 3 when to do so is called for by the loading of the conveyor belt.

The present invention is, of course, in no way restricted to the specific disclosure of the specification and drawing, but also encompasses any modifications within the scope of the appended claims.

What I claim is:

1. A conveyor belt of relatively short length and made of elastomeric material for use as a discharge or feeder belt, the conveyor belt being particularly suitable for absorbing the heavy impact loads of materials having angular edges falling upon the belt, the conveyor belt comprising:

an upper cover layer of elastomeric, wear-resistant rubber, having an upper surface upon which the material to be conveyed impacts and rests;

an elastically deformable insert of doubleweave cloth disposed beneath the upper cover layer which provides an air space within the upper cover layer; the doubleweave cloth comprising upper and lower webs each having longitudinally extending fabric strands, the upper and lower webs being joined by connecting strands woven between the longitudinally extending fabric strands of the upper and lower webs;

a core layer of readily bondable rubber adjacent to the deformable insert;

an array of parallel steel cables within the core layer and bonded to the core layer for reinforcing the elastomeric conveyor belt;

a lower cover layer of elastomeric, wear-resistant rubber; and elastomeric material extending longitudinally along the outside edges of the belt and being sealed to the elastomeric layers to completely surround the doubleweave material within the belt and entrap air within the belt, whereby impacts on the upper cover layer are absorbed by the elastically deformable layer and entrapped air prior to being transmitted to the elastomeric layer, steel cables and lower cover layer for which layers the elastically deformable layer and entrapped air form a cushion thereby prolonging the life of the conveyor belt.

* * * * *